April 15, 1952 — B. P. ADAMS — 2,593,237
SCALE STRUCTURE
Filed July 13, 1949 — 2 SHEETS—SHEET 1

Inventor
BRUCE P. ADAMS

April 15, 1952  B. P. ADAMS  2,593,237
SCALE STRUCTURE
Filed July 13, 1949  2 SHEETS—SHEET 2
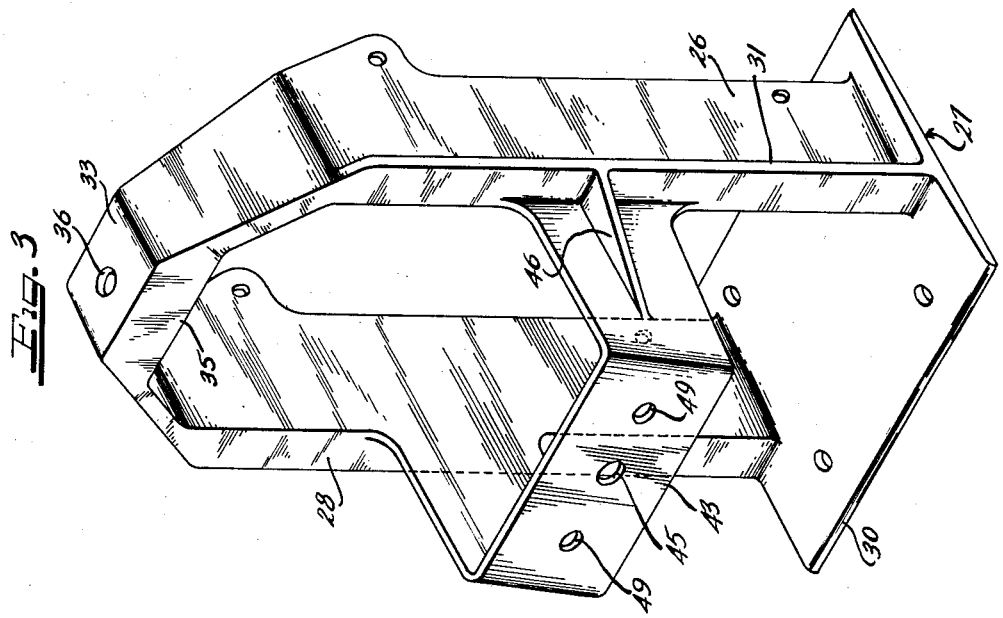
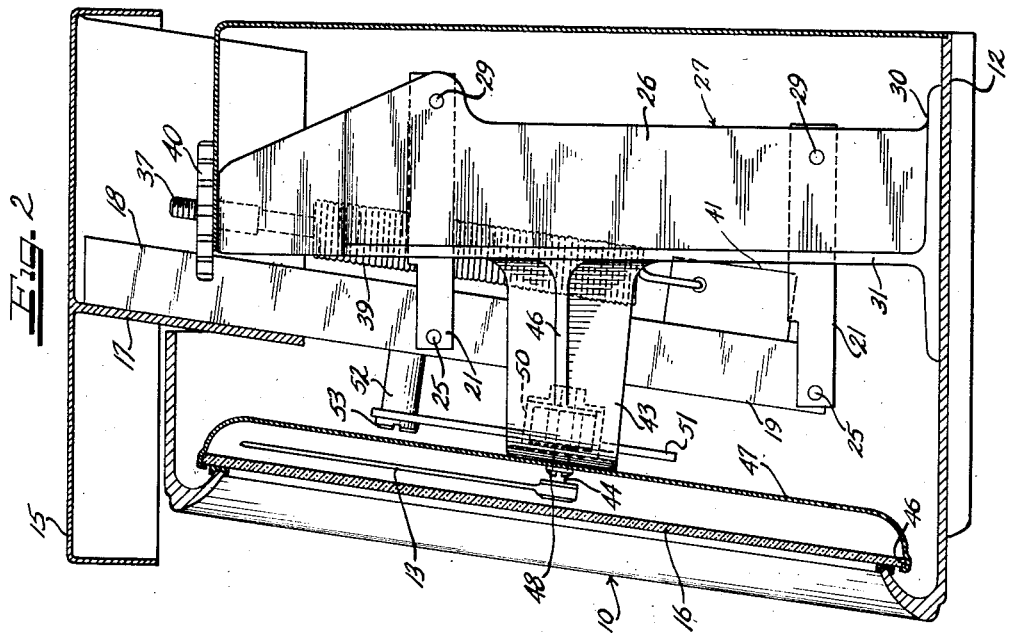
Inventor
BRUCE P. ADAMS

Patented Apr. 15, 1952

2,593,237

UNITED STATES PATENT OFFICE 2,593,237

SCALE STRUCTURE

Bruce P. Adams, Wilmette, Ill., assignor to Pelouze Manufacturing Company, Evanston, Ill., a corporation of Illinois Application July 13, 1949, Serial No. 104,499

6 Claims. (Cl. 265—68)

This invention relates to improvements in scale structures and has as its principal objects to reduce the chances of inaccuracies occurring in scales by providing an improved scale frame structure, maintaining the movable parts of the scale at a constant fixed relationship with respect to each other.

Heretofore scales and more particularly desk or letter scales, requiring a relatively high degree of accuracy in weighing small articles, have been subject to inaccuracies occurring both during manufacture and during use of the scale, due to the fact that the component parts of the scale have been connected to separate frame members or supports, usually stamped, with the result that if the separate frame members are not properly aligned and assembled, inaccuracies in weighing will arise which are oftentimes difficult to detect. Also, if the scale should be mishandled or dropped so the supports for the component parts of the scale are sprung out of alignment with respect to each other, the accuracy of the scale is destroyed.

My invention has among other objects, to overcome these difficulties, and to facilitate the ease of assembling the scale with the assurance that the assembled scale will weight accurately through its intended weighing range, by mounting all of the component parts of the scale on a single rugged non-deformable frame structure.

A more specific object of my invention is to improve upon the present forms of scale structures by providing a single unitary integral cast sub frame of a rigid and non-deformable construction forming a support for the operative parts of the scale.

These and other objects of my invention will appear from time to time as the following specification proceeds and with reference to the accompanying drawings wherein:

Figure 2 is a transverse sectional view taken substantially along line II—II of Figure 1, but showing certain parts of the scale and dial in transverse section; and Figure 3 is an enlarged isometric view showing one form unitary sub frame constructed in accordance with my invention for supporting the component parts of the scale.

Figure 1:
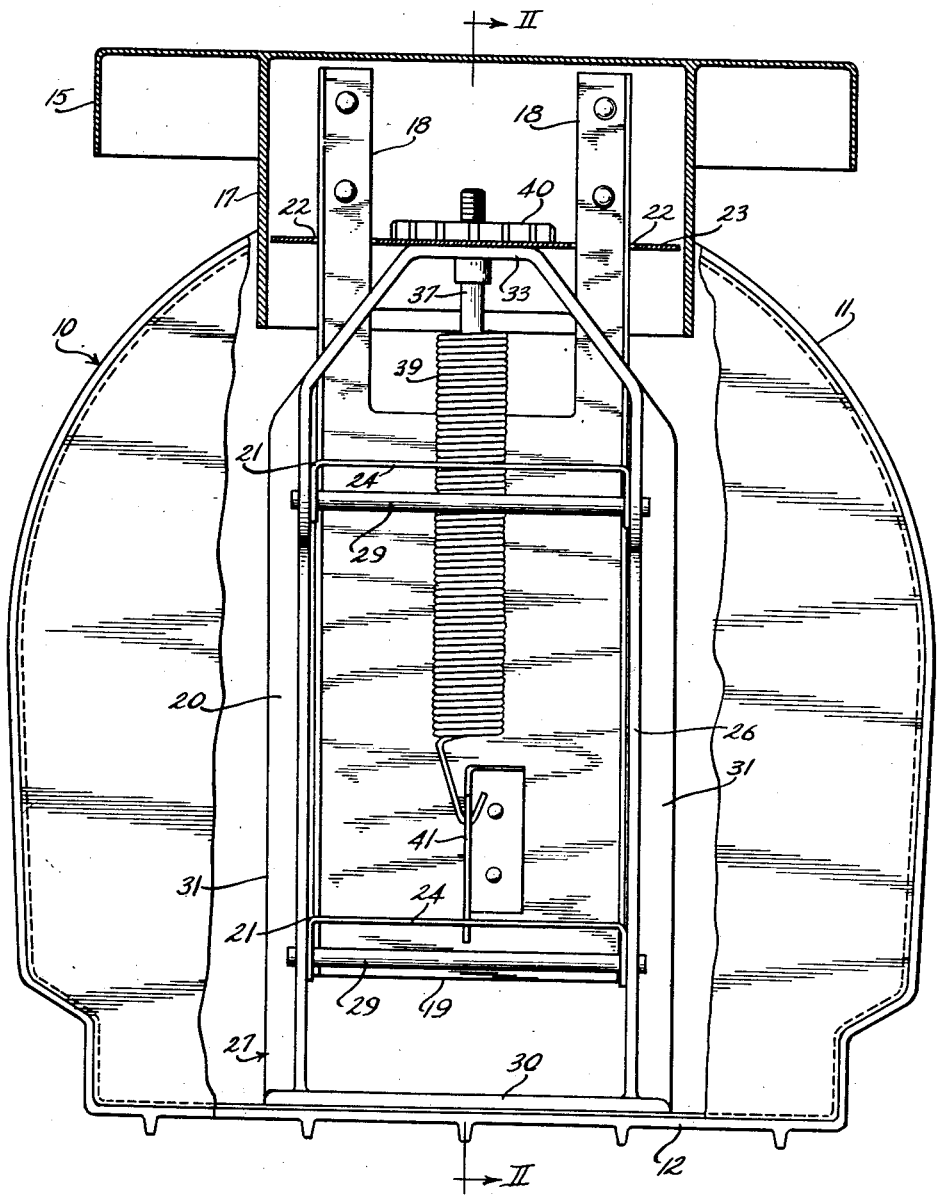
Figure 1 is an end view of a scale looking toward the front end thereof, with parts of the casing broken away, to show the operating mechanism thereof, and with certain other parts shown in vertical section.

In the drawings, I have shown a scale 10 including a casing 11 enclosing the component parts of the scale and having a base 12 upon which the scale rests. Said scale also has a needle-type pivoted pointer 13 indicating weights of articles placed on a platform 15, on a dial 16, which may be printed on a glass crystal encasing said pointer.

The platform 15 is herein shown as having a depending frame structure 17, to which is secured two parallel spaced vertically extending legs 18—18, herein shown as being formed integrally with and extending upwardly from a plate 19. Opposite sides of said plate are bent inwardly at right angle thereto, the bent portions thereof extending along the legs 18, 18, to stiffen said legs and to form a means to which a pair of parallel links 21—21 may be attached, to support said plate and platform to move vertically in a plurality of parallel planes. The parallel links 21—21 are herein shown as being formed from plates 24—24 having opposite sides thereof bent at right angles with respect thereto, to form said links, and being cut away adjacent said plate 19 to provide clearance therefor. Said links 21, 21 are pivotally connected to the inwardly turned sides of said plate by pivotal pins 25—25. The opposite ends of said links are pivotally connected to upright side walls 26, 26 of a unitary sub frame 27 in vertically spaced relation with respect to each other, by pivotal pins 29—29.

The unitary sub frame 27 is herein shown as being an integral cast structure, although it may be of a welded construction, and has a base 30 adapted to be secured to the base 12 of the casing 11, and having the side walls 26—26 extending upwardly from opposite sides thereof. Reinforcing ribs 31, 31 extend upwardly from said base along the outer sides of said side walls, to lend rigidity thereto. The upper ends of said side walls are shown as being inclined towards each other and as being connected together by a horizontal bridge member 33. A rib 35 extends inwardly from said horizontal bridge 33 to lend rigidity thereto and to prevent deformation of said sub frame.

The horizontal bridge 33, is herein shown as having an aperture 36 extending therethrough, through which extends a threaded spring supporting member 37. Said threaded member has a spring 39 secured to its lower end, and also extends through the top of the casing 11 and has an adjusting nut 40 threaded thereon, and resting on the top of the casing 11, to vertically adjust the position of the tension spring 39, and to calibrate the scale. The lower end of said tension spring 39 is connected to an ear or lug 41 extending inwardly from the plate 19 at right angle with respect thereto.

The sub frame 27 also has a yoke structure 43, extending from the side walls 26, 26, intermediate the ends thereof and herein shown as being of a substantially U-shaped form and as having the pointer 13 pivotally supported thereon on a shaft 44, journalled in an apertured portion 45 thereof. The sides of said yoke are shown as being reinforced by reinforcing ribs or gussets 46—46 connected between the sides of said yoke and the reinforcing ribs 31, 31.

The outer face of the yoke structure 43 is inclined at the angle of the dial 16 and has a backing plate 47 for the pointer 13 secured thereto, as by machine screws 48, 48 extending through apertured portions 49, 49 of said yoke. Said backing plate is herein shown as being of a dish like formation with the dial 16 mounted in the outer rim thereof and enclosing said plate and the pointer 13.

A substantially U-shaped bearing support member 50 having its open portion facing the side of the cross member of the yoke structure 43, opposite from the plate 47, is secured to said cross member by the machine screws 48, 48, extending through the apertures 49, 49. Said support member forms the rear bearing support for the pointer shaft 44 and also forms a slidable guide for the outer side of a rack 51. Said rack is herein shown as abutting the outer end of a boss 52, extending outwardly from said plate, 19, and as being secured to said boss by a machine screw 53, and as depending therefrom. Said rack has teeth (not shown) formed on the inner edge thereof which mesh with the teeth of a pinion (not shown) on the pointer shaft 44, as is well known to those skilled in the art, for pivoting said pointer shaft and the pointer 13 upon vertical movement of the platform 15 against the spring 39.

It may be seen from the foregoing that the sub frame 27 is of a rigid non-deformable construction and forms a unitary non-deformable support for the spring 39 and for all of the pivotally movable parts of the scale, holding the pivotal axes of said parts in a constant fixed spaced relation with respect to each other, and thus reducing the possibility of inaccuracies in the scale.

It may further be seen that said sub frame may be made from an integral casting or an integral welded construction, and that the supports and pivotal axes for the various parts of the scale may be accurately located, to facilitate the assembly of the scale, and that this unitary support structure, besides reducing the liability for inaccuracies to occur in the scale due to misalignment or improper location or assembly, also provides a rugged frame structure supporting the component parts of the scale, which reduces the likelihood for inaccuracies to arise in the scale after use, due to rough or improper use of the scale.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a scale structure, a unitary integrally cast sub frame having a base, parallel spaced side walls extending upwardly therefrom having platform supporting links pivoted thereon and extending in parallel spaced relation with respect thereto, a bridge member connecting the upper ends of said side walls together having a spring depending therefrom and connected with said links and holding said links and the platform in upwardly extended relation with respect to said frame, and a yoke structure extending outwardly from said side walls and connecting said side walls together intermediate their ends, said yoke structure having a forward wall spaced outwardly from said side walls and forming a pivotal support for the scale pointer shaft and also having the scale dial mounted thereon, and with said base, side walls and bridge forming a rigid non-deformable frame carrying all of the essential parts of the scale and maintaining the pivotal axes of the movable parts thereof in a constant fixed relationship.

2. In a scale structure including a casing having a base, a platform, a pair of parallel links connected to said platform and mounting said platform for vertical movement with respect to said base in a plurality of parallel planes, a spring for holding said platform in an upwardly extended position, an indicating pointer pivoted for movement about an axis transverse to the direction of movement of said platform and an operative connection between said platform and pointer, pivotally moving said pointer upon vertical movement of said platform, the improvement comprising an upright hollow frame mounted within said casing on said base and having parallel spaced side walls having said links pivotally connected thereto, an upper portion bridging said side walls and having one end of said spring connected thereto and a yoke structure extending outwardly from said side walls and including a forward wall spaced outwardly from said side walls and having said pointer pivotally mounted thereon and forming a unitary frame supporting all of the component parts of the scale structure independently of said casing.

3. In a scale structure including a casing having a base, a platform spaced above said casing, a pair of parallel links connected to said platform and mounting said platform for vertical movement, a spring for holding said platform in an upwardly extended position, a pivoted indicating pointer, and an operative connection between said platform and pointer, pivotally moving said pointer upon vertical movement of said platform, the improvement comprising a unitary sub frame contained within said casing having a base, two side walls extending upwardly from said base, a bridge member connecting the upper ends of said side walls together, and a yoke structure extending outwardly from said said side walls and connecting said side walls together intermediate their ends, said yoke structure having a forward wall forming a support for the dial and pointer of the scale and with said base, side walls and bridge forming a rigid non-deformable frame independent of said casing, forming the pivotal supports for said parallel links and pointer and forming a support for said spring, and maintaining the relationship of said pivotal axes in fixed spaced relationship with respect to each other and with respect to said spring and platform.

4. In a scale structure including a casing, a platform mounted for vertical movement with respect to said casing, a pair of parallel links connected to said platform and mounting said platform for vertical movement, a spring for holding said platform in an upwardly extended position, a pivoted pointer, and an operative connection between said platform and pointer pivotally moving said pointer upon vertical movement of said platform, the improvement comprising an integrally cast unitary sub frame spaced inwardly of the walls of said casing and having a base mounted on the base of said casing, two side walls extending upwardly from said base and forming supports for the pivotal axes of said parallel links, a bridge member connecting the upper ends of said side walls together and having the upper end of said spring connected thereto, and a yoke structure extending laterally from said side walls and connecting said side walls together intermediate their ends and forming a pivotal support for said pointer, said frame including said side walls, bridge and yoke structure forming a rigid non-deformable frame, so constructed and arranged as to form supports for said parallel links and pointer and spring, spaced with said casing and maintaining the relationship between said parts fixed with respect to each other.

5. In a scale structure, a casing having a base, an integral unitary subframe mounted on said base and spaced inwardly of the walls of said casing, said subframe forming a support for all of the component parts of the scale free from said casing and including a base secured to the base of said casing, two spaced side walls extending upwardly from said base, a bridge member connecting said side walls together at their upper ends, a yoke structure extending outwardly from said side walls and connecting said side walls together intermediate their ends and having a forwardly spaced wall extending in the plane of the dial of the scale and having the dial mounted thereon and the pointer shaft journaled therein, two vertically spaced parallel links connected to said side walls and extending in generally parallel relation with respect to said side walls, an integral plate pivotally connected to said links at spaced apart points and extending upwardly through the top of the casing and having operative connection with said pointer, and a scale platform on the upper end of said plate.

6. A scale structure comprising a casing having a base, an integral unitary subframe mounted on said base within said casing, said subframe forming a support for all of the component parts of the scale free from said casing and including a base, two spaced side walls extending upwardly from said base, a bridge member connecting said side walls together at their upper ends, a yoke structure connecting said side walls together intermediate their ends and extending outwardly therefrom and having a forwardly spaced wall extending in the plane of the dial of the scale and having the dial mounted thereon, a shaft journaled in said yoke, and having a pointer on its outer end cooperating with said dial, two vertically spaced parallel links connected to said side walls and extending in generally parallel relation with respect to said side walls, an integral plate pivotally connected to said links at spaced apart points and extending upwardly through the top of said casing, a scale platform on the upper end of said plate, a spring depending from said bridge and connected with said plate and urging said platform into an elevated position, a rack pivotally secured to said plate in spaced relation with respect thereto and depending from its point of pivotal connection to said plate into operative engagement with said shaft to pivot said shaft and pointer upon vertical movement of said platform and rack.

BRUCE P. ADAMS.

REFERENCES CITED

The following references are of record in the file of this patent:

UNITED STATES PATENTS

| Number | Name | Date |
| --- | --- | --- |
| 289,450 | Runge | Dec. 4, 1883 |
| 561,309 | Gilfillan | June 2, 1896 |
| 612,968 | Hansen | Oct. 25, 1898 |
| 1,210,382 | Weber | Dec. 26, 1916 |